June 28, 1932.  H. A. DAYNES ET AL  1,865,306
DEVICE FOR MEASURING THE THICKNESS OF OBJECTS
Filed Nov. 1, 1929
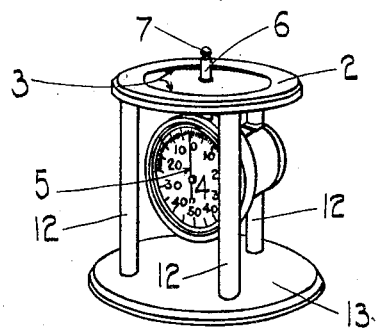
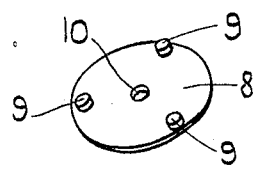
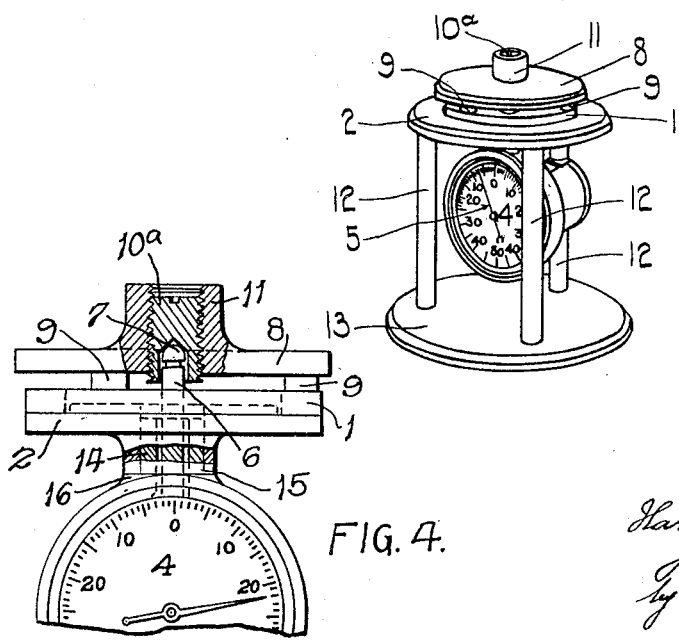
Inventors:
Harold A. Daynes, &
John R. Scott
by Herbert W. Jenner
Attorney.

Patented June 28, 1932

1,865,306

UNITED STATES PATENT OFFICE

HAROLD ASHLEY DAYNES AND JOHN RICHARD SCOTT, OF CROYDON, ENGLAND, ASSIGNORS TO THE RESEARCH ASSOCIATION OF BRITISH RUBBER MANUFACTURERS, OF CROYDON, ENGLAND

DEVICE FOR MEASURING THE THICKNESS OF OBJECTS

Application filed November 1, 1929, Serial No. 404,160, and in Great Britain January 7, 1929.

This invention relates to apparatus for measuring the thickness of an object, for example a sheet, slab, ring, or similar piece of material having two surfaces which are nominally plane and parallel to one another, the thickness to be measured being the mean distance between the said surfaces.

The invention is particularly adapted to the measurement of the thickness of samples of rubber, of plastic material, of paper, and of similar easily deformable materials.

According to the invention, in a device of the kind stated an average of the thicknesses at two or more points is obtained in one operation by means of a rigid member having a plurality of contact surfaces adapted to be in contact simultaneously with the face of the object to be measured. In the improved thickness-measuring apparatus, there are suitably combined, a fixed member with a supporting surface to receive the object to be measured, a rigid movable member with a plurality of contact surfaces adapted to rest on the object to be measured, and means for measuring the distance between the supporting surface and a fixed point in the movable member situated substantially in the same plane as the contact surfaces and at predetermined distances from them. The movable member is constrained so as to be capable of rotation in any direction about the said fixed point without translation of the said fixed point. An average of the thicknesses at the several points corresponding to the several contact surfaces is obtained at one operation.

Preferably the movable member is provided with three suitably disposed contact surfaces. In the particular case in which an arithmetic mean of the thicknesses is required the contact surfaces are equidistant from one another and the fixed point is equidistant from the centre of the three contact surfaces.

In the apparatus that will now be described the invention is adapted for measuring a ring of nominally rectangular cross-section such as is used for the testing of the mechanical properties of the material.

The thickness of such a ring is usually measured by a caliper gauge in which two members, each terminating in a plane surface, move in guides towards one another under the pressure of a spring, the plane surfaces remaining parallel during the movement, so as to grip the ring lightly on the two faces of which the mutual distance is to be determined. The distance between the gripping surfaces of the gauge is then indicated by a direct reading on a dial-and-pointer gauge. As in many cases the thickness of a ring of the type described varies from place to place, readings must usually be taken at several places to provide data for the calculation of an average value.

By our invention in the embodiment thereof under notice we provide a means for obtaining a mean of the thicknesses at three points in one operation. At the same time we arrange that the pressure exerted on the material under examination is reduced to a minimum by reason of its distribution over a large area, so that distortion of the material, which would cause errors in the readings, is reduced.

The object to be measured is supported on a fixed plane surface. A movable member of rigid construction is provided with three toes situated so as to bear on three points on the object, said toes terminating in appropriate and " preferably co-planar surfaces ".

A measurement is then made by placing the movable member on the object and determining the distance between the plane supporting surface and a point in the movable member equidistant from and substantially in the same plane as the contact surfaces of the toes.

Fig. 1 of the accompanying drawing is a perspective view of a device embodying the invention.

Fig. 2 is a perspective view of the movable member of the device, which member is not shown in Fig. 1.

Fig. 3 is a similar view to Fig. 1 showing the device in operation.

Fig. 4 is a fragmentary view illustrating a modified construction of the device, which will be hereinafter described.

The device illustrated is adapted for measuring the thickness of a rubber ring. The said rubber ring 1 is supported on the plane surface of a horizontal plate 2 having a circular boss or recess 3 for centering the ring. A gauge 4 of the dial-and-pointer type, capable of reading to one-hundredth of a millimetre, is located beneath the supporting plate 2 and rigidly attached to it. The movement of the pointer 5 of the gauge is caused by a stem 6 which projects upwards from the case of the gauge 4 and terminates in a spherical knob 7. The gauge is fitted with an internal spring which tends to force the stem 6 outwards in the direction of its own axis until it is arrested by an internal stop. A known gauge of this type is so fixed that the stem projects vertically upwards through a central hole in the supporting plate 2 and so that the stem is co-axial with the centering boss or recess 3 of the plate, see Fig. 1.

The movable member is in the form of a disc 8 with three equidistant toes 9 having the centers of their contacting surfaces on a circle whose diameter is the mean of the internal and external diameters of the ring 1 being measured, the said "contact circle" being concentric with the movable member. On the under side of the movable member is a central conical recess 10 with its axis perpendicular to the plane of the "contact circle" and of such dimensions that when its conical surface rests on the spherical knob 7 of the gauge stem 6, the centre of the spherical knob 7 coincides approximately with the centre of the "contact circle". The conical recess of the movable member is formed in a screw 10ª that is adjustable in the boss 11 of the movable member in a manner such that the conical surface is adjustable in the direction of its axis for the purpose of zero adjustment of the gauge. The location of the centre of the spherical knob 7 when engaged with the conical recess 10 constitutes what may be termed a "fixed" point relatively to the contact surfaces of the three toes 9. The movable member 8 is of such weight that it can depress the gauge-stem 6 against the resistance of the internal spring until arrested by the three toes 9 resting on the ring 1 under examination. When this occurs the position of the centre of the "contact circle" relative to the surface of the supporting plate 2 is ascertainable from the reading of the gauge and gives a measure of a mean of the thicknesses of the rubber ring 1 at the three points of contact with the toes 9. The gauge 4 may be calibrated or checked by means of a metal ring of known thickness, for example of a thickness equal to the nominal thickness of the rubber ring 1.

In the device illustrated by way of example in Figs. 1, 2 and 3 the supporting plate 2 is mounted on three pillars 12 on a circular base 13 and the gauge is rigidly attached to one of the pillars.

In the modification of the device which is shown in Fig. 4 the supporting plate 2 is carried on the upper portion of the gauge 4 and in fixed relation thereto, the gauge being independently supported on another base, not shown. The case of the gauge 4 is formed or provided with an upwardly projecting cylindrical boss 14 rigidly fixed thereto, the boss being pierced by a central hole to permit the passage of the gauge stem 6. The supporting plate 2 is formed with a central hole and a downwardly projecting sleeve 15 which fits tightly over the boss 14, the lower end of the sleeve 15 contacting with an annular boss 16 on the top of the gauge case so as to locate the supporting plate 2 in a vertical direction.

It will be understood that the example given of an application of the device to the thickness measurement of rubber rings is not to be considered in any sense as restricting the invention to the precise construction described or to the measurement of the particular material mentioned.

What we claim as our invention is:—

1. A device for measuring the thickness of an object, comprising in combination a fixed surface for supporting said object, a measuring instrument mounted in fixed relation to said surface, a movable rigid member having a plurality of contact surfaces adapted to simultaneously contact at a corresponding number of places with that face of the said object which is remote from the supporting surface, and means operatively associating said measuring instrument with a fixed point in the said rigid member equidistant from said contact surfaces.

2. A device for measuring the thickness of an object, comprising in combination a fixed surface for supporting said object, a measuring instrument mounted in fixed relation to said surface, a movable rigid member having a plurality of contact surfaces adapted to simultaneously contact at a corresponding number of places with that face of the said object which is remote from the supporting surface, and an operating member operatively associating said measuring instrument with a fixed point in the said rigid member equidistant from said contact surfaces, said rigid member resting under its own weight on said object and on said operating member and being of a weight not sufficient to deform said object but sufficient to actuate said instrument.

3. A device for measuring the thickness of an object, comprising in combination a fixed surface for supporting said object, a measuring instrument mounted in fixed relation to said surface, a movable rigid member having a plurality of contact surfaces adapted to simultaneously contact at a corresponding number of places with that face of the said object which is remote from the supporting surface, an operating member operatively associating said measuring instrument with a predetermined point in the said rigid member equidistant from said contact surfaces, and means for adjusting the position of said predetermined point for the purpose of zero adjustment of the measuring instrument.

4. A device for measuring the thickness of an object, comprising in combination a fixed surface for supporting said object, a measuring instrument mounted in fixed relation to said surface, a movable rigid member having a plurality of contact surfaces adapted to simultaneously contact at a corresponding number of places with that face of the said object which is remote from the supporting surface, an operating member operatively associating said measuring instrument with a predetermined point in the said rigid member equidistant from said contact surfaces, and means for adjusting the position of said predetermined point for the purpose of zero adjustment of the measuring instrument, said rigid member resting under its own weight on said object and on said operating member and being of a weight not sufficient to deform said object but sufficient to actuate said instrument.

5. A device for measuring the thickness of an annular object, comprising in combination a horizontal fixed surface for supporting said object, a measuring instrument mounted below and in fixed relation to said surface, a movable rigid member having three equidistant toes with their centres on a circle whose diameter is the mean of the internal and external diameters of the object being measured, said toes terminating in co-planar contact surfaces adapted to simultaneously contact at a corresponding number of places with that face of the said object which is remote from the supporting surface, and a vertically disposed operating member operatively associating said measuring instrument with a fixed point in said rigid member equidistant from said contact surfaces, said rigid member resting under its own weight on said object and on said operating member and being of a weight not sufficient to deform said object but sufficient to depress said operating member against the resistance of means in the instrument constantly urging it upwardly and to actuate said instrument.

6. A device for measuring the thickness of an annular object, comprising in combination a horizontal fixed surface for supporting said object, a measuring instrument mounted below and in fixed relation to said surface, a movable rigid member having three equidistant toes with their centres on a circle whose diameter is the mean of the internal and external diameters of the object being measured, said toes terminating in co-planar contact surfaces adapted to simultaneously contact at a corresponding number of places with that face of the said object which is remote from the supporting surface, a vertically disposed operating member operatively associating said measuring instrument with a predetermined point in said rigid member equidistant from said contact surfaces, said rigid member resting under its own weight on said object and on said operating member and being of a weight not sufficient to deform said object but sufficient to depress said operating member against the resistance of means in the instrument constantly urging it upwardly and to actuate said instrument, and means for adjusting the position of said predetermined point for the purpose of zero adjustment of the measuring instrument.

7. A device for measuring the thickness of an annular object as claimed in claim 6, having a spherical knob on the vertically disposed instrument operating member engaging a conical recess in a screw centrally disposed in the movable rigid member with its axis perpendicular to the plane of the contact surfaces of the latter and adjustable in the direction of its axis, said screw constituting the means for adjusting the position of the predetermined point in the rigid member with which the measuring instrument is associated to thereby effect the zero adjustment of said instrument.

In testimony whereof we affix our signatures.

HAROLD ASHLEY DAYNES.
JOHN RICHARD SCOTT.